US011240305B2

(12) United States Patent
Meredith et al.

(10) Patent No.: US 11,240,305 B2
(45) Date of Patent: Feb. 1, 2022

(54) TASK ALLOCATION AMONG DEVICES IN A DISTRIBUTED DATA STORAGE SYSTEM

(71) Applicant: AT&T Intellectual Property I, L.P., Atlanta, GA (US)

(72) Inventors: Sheldon Kent Meredith, Roswell, GA (US); William Cottrill, Canton, GA (US); Juliette Zerick, Alpharetta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 884 days.

(21) Appl. No.: 15/222,729

(22) Filed: Jul. 28, 2016

(65) Prior Publication Data
US 2018/0032379 A1    Feb. 1, 2018

(51) Int. Cl.
*G06F 9/50* (2006.01)
*H04L 29/08* (2006.01)

(52) U.S. Cl.
CPC ........ *H04L 67/1097* (2013.01); *G06F 9/5044* (2013.01); *H04L 67/32* (2013.01); *G06F 9/5027* (2013.01)

(58) Field of Classification Search
CPC . G06F 17/30557; G06F 15/173; G06Q 10/06; H04L 29/08135; H04L 45/02; H04L 47/783; H04L 67/1008; H04M 3/5234
See application file for complete search history.

(56) References Cited

U.S. PATENT DOCUMENTS

| 5,768,594 A | * | 6/1998 | Blelloch | G06F 9/5066 717/149 |
| 6,112,243 A | * | 8/2000 | Downs | G06F 9/5044 709/219 |
| 6,597,699 B1 | | 7/2003 | Ayres | |
| 6,732,139 B1 | * | 5/2004 | Dillenberger | G06F 9/505 709/226 |
| 7,263,183 B1 | * | 8/2007 | Klein | H04M 3/42374 379/265.09 |

(Continued)

OTHER PUBLICATIONS

Celaya, Javier et al. "A task routing approach to large-scale scheduling." Dec. 2012. Future Generation Computer Systems 29.5: 1097-1111.*

(Continued)

*Primary Examiner* — Lewis A Bullock, Jr.
*Assistant Examiner* — Gilles R Kepnang (57) ABSTRACT

In one example, a processor may receive a first request to process a first task, the first request including a first estimated central processing unit utilization for the first task and a first estimated memory utilization for the first task and receive central processing unit capacities and memory capacities of a plurality of sub-data routers including at least a first sub-data router. The processor may further determine that the first sub-data router has a lowest central processing unit capacity from among the plurality of sub-data routers that is sufficient to accommodate the first estimated central processing unit utilization for the first task and determine that the first sub-data router has a memory capacity that is sufficient to accommodate the first estimated memory utilization for the first task. The processor may then assign the first task to the first sub-data router.

20 Claims, 5 Drawing Sheets

(56) References Cited

U.S. PATENT DOCUMENTS

| | | | | |
|---|---|---|---|---|
| 7,853,948 B2* | 12/2010 | Berstis | | G06F 9/505 |
| | | | | 718/102 |
| 8,347,295 B1* | 1/2013 | Robertson | | G06Q 10/06 |
| | | | | 718/103 |
| 8,484,307 B2 | 7/2013 | Arimilli et al. | | |
| 8,843,929 B1* | 9/2014 | Oppenheimer | | G06F 9/5044 |
| | | | | 718/102 |
| 9,158,588 B2 | 10/2015 | Abeles et al. | | |
| 9,201,691 B2 | 12/2015 | Gu et al. | | |
| 9,304,821 B2 | 4/2016 | Hartman et al. | | |
| 9,305,015 B2 | 4/2016 | Lacapra et al. | | |
| 9,329,937 B1* | 5/2016 | Grant | | G06F 11/14 |
| 9,354,972 B2 | 5/2016 | Grube et al. | | |
| 10,404,521 B2* | 9/2019 | McChord | | H04L 43/0811 |
| 2005/0240924 A1* | 10/2005 | Jones | | G06F 9/4881 |
| | | | | 718/100 |
| 2005/0268300 A1* | 12/2005 | Lamb | | G06F 9/5038 |
| | | | | 718/100 |
| 2006/0053221 A1* | 3/2006 | Matsui | | H04L 45/00 |
| | | | | 709/225 |
| 2007/0094662 A1* | 4/2007 | Berstis | | G06F 9/505 |
| | | | | 718/102 |
| 2007/0143762 A1* | 6/2007 | Arnold | | G06F 9/5044 |
| | | | | 718/103 |
| 2007/0234366 A1* | 10/2007 | Morich | | G06F 9/5083 |
| | | | | 718/104 |
| 2008/0059557 A1* | 3/2008 | DeSantis | | G06F 9/5044 |
| | | | | 709/201 |
| 2008/0115143 A1* | 5/2008 | Shimizu | | G06F 9/5066 |
| | | | | 718/105 |
| 2008/0244584 A1* | 10/2008 | Smith | | G06F 9/4881 |
| | | | | 718/102 |
| 2009/0254914 A1* | 10/2009 | Sundaresan | | G06F 9/505 |
| | | | | 718/103 |
| 2009/0313633 A1* | 12/2009 | Nardelli | | G06F 9/505 |
| | | | | 718/104 |
| 2010/0005472 A1* | 1/2010 | Krishnaraj | | G06F 9/5038 |
| | | | | 718/104 |
| 2010/0146038 A1* | 6/2010 | Hajiaghayi | | H04L 67/2842 |
| | | | | 709/203 |
| 2011/0041136 A1* | 2/2011 | Messier | | G06F 9/5066 |
| | | | | 718/105 |
| 2012/0275344 A1* | 11/2012 | Hajiaghayi | | H04L 45/00 |
| | | | | 370/255 |
| 2013/0054784 A1* | 2/2013 | Yadav | | H04L 43/18 |
| | | | | 709/224 |
| 2013/0232504 A1* | 9/2013 | Yan | | G06F 1/3206 |
| | | | | 718/105 |
| 2014/0122636 A1 | 5/2014 | Peake et al. | | |
| 2014/0136779 A1 | 5/2014 | Guha et al. | | |
| 2014/0280701 A1* | 9/2014 | Wolcott | | H04L 69/327 |
| | | | | 709/217 |
| 2014/0281817 A1* | 9/2014 | Grube | | G06F 11/1076 |
| | | | | 714/769 |
| 2014/0297833 A1 | 10/2014 | Bedini et al. | | |
| 2015/0234682 A1 | 8/2015 | Dageville et al. | | |
| 2015/0312335 A1* | 10/2015 | Ying | | H04L 67/1065 |
| | | | | 709/201 |
| 2015/0363232 A1* | 12/2015 | Li | | G06F 9/5011 |
| | | | | 718/104 |
| 2015/0373119 A1* | 12/2015 | Kaneko | | G06F 9/5044 |
| | | | | 709/219 |
| 2016/0062795 A1* | 3/2016 | Hu | | H04L 67/1095 |
| | | | | 718/104 |
| 2016/0292011 A1* | 10/2016 | Colson | | G06Q 10/06311 |
| 2016/0378569 A1* | 12/2016 | Ristock | | G06F 9/5083 |
| | | | | 718/105 |
| 2017/0004219 A1* | 1/2017 | Shraer | | G06F 17/30557 |
| 2018/0041600 A1* | 2/2018 | Aikoh | | G06F 11/203 |

OTHER PUBLICATIONS

Apache. "CapacityScheduler Guide". 2011. Apache Hadoop. All Pages, <https://hadoop.apache.org/docs/r1.2.1/capacity_scheduler.html> (Year: 2011).*

Laoutaris, Nikolaos. "On the Optimization of Storage Capacity Allocation for Content Distribution", Dated 2004. pp. 1-20.

* cited by examiner

TASK ALLOCATION AMONG DEVICES IN A DISTRIBUTED DATA STORAGE SYSTEM

The present disclosure relates generally to distributed data storage and processing systems, and more particularly to an architecture where multiple task handlers service requests for task processing from multiple requesting devices, and route the tasks to different sub-data routers depending upon the memory and central processing unit requirements of the tasks, and the memory and central processing unit capacities of the sub-data routers.

BACKGROUND

Some types of distributed data storage and processing systems store files as large blocks, e.g., 128 megabytes (MB) or more, which may be spread over multiple physical storage devices in various locations. In addition, multiple copies of the blocks may be stored in different physical storage devices for redundancy purposes. To track the locations of files and/or the blocks of such files, some systems may include a central data router that knows where the blocks are being stored. When a requesting machine seeks to access a file, data within a file, or multiple files stored in the system, a request may be directed to the central data router to determine which physical devices have stored the relevant blocks. However, numerous simultaneous requests may overload the central data router.

SUMMARY

In one example, the present disclosure discloses a device, computer-readable medium, and method for assigning a task to a sub-data router. For instance, a method may include a processor receiving a first request to process a first task, the first request including a first estimated central processing unit utilization for the first task and a first estimated memory utilization for the first task, and receiving central processing unit capacities and memory capacities of a plurality of sub-data routers including at least a first sub-data router. The processor may further determine that the first sub-data router has a lowest central processing unit capacity from among the plurality of sub-data routers that is sufficient to accommodate the first estimated central processing unit utilization for the first task, and determine that the first sub-data router has a memory capacity that is sufficient to accommodate the first estimated memory utilization for the first task. The processor may then assign the first task to the first sub-data router.

In another example, the present disclosure discloses an additional device, computer-readable medium, and method for assigning a task to a sub-data router. For instance, a method may include a processor receiving a first request to process a first task, the first request including a first estimated central processing unit utilization for the first task and a first estimated memory utilization for the first task, and receiving central processing unit capacities and memory capacities of a plurality of sub-data routers including at least a first sub-data router. The processor may further determine that the first sub-data router has a lowest memory capacity from among the plurality of sub-data routers that is sufficient to accommodate the first estimated memory utilization for the first task, and determine that the first sub-data router has a central processing unit capacity that is sufficient to accommodate the first estimated central processing unit utilization for the first task. The processor may then assign the first task to the first sub-data router.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure optimize the allocation of tasks among distributed computers, or nodes, by relocating the decision processing about which nodes should handle which tasks from a central data router to a set of sub-data routers. For example, in other approaches, when a machine has a task to execute, the machine monitors the availability of a set of other, remote machines and determines which among them to send the task. Some types of distributed data storage and processing systems have a central data router that knows where files, or blocks of the files, are being stored in order to manage access and redundancy. Accordingly, when a requesting machine seeks to access a file, data within a file, or multiple files stored in the system, a request may be directed to the central data router to determine which nodes have stored the relevant blocks. However, numerous simultaneous requests may overload the central data router. In contrast, in examples of the present disclosure a plurality of sub-data routers are utilized, where each of the sub-data routers has a view of the statuses and capabilities of the various nodes in the system.

In one example, a task from a requesting machine may be distributed to any sub-data router based upon which sub-data router is most idle in terms of processing and memory. However, if each requesting machine were left to select which sub-data router to process a task, multiple requesting machines could still overload one of the sub-data routers by making the same selection at or around the same time. In one example, randomization of task assignments to sub-data routers might avoid this issue. However, this assumes that all of the sub-data routers have the same capabilities. If the sub-data routers do not have similar capabilities, then every requesting machine tasking the sub-data routers has to know about the relative capabilities. In addition, just knowing about the capabilities of any of the sub-data routers will not provide any insights as to their current utilizations.

Examples of the present disclosure avoid each requesting machine having to know about the capabilities and current utilizations of each sub-data router. Instead, each requesting machine may send task requests to a designated or assigned task handler of a plurality of task handlers, each of which can take task requests from many different requesting machines. In one example, a requesting machine may also include an estimate of a central processing unit (CPU) utilization and memory utilization of the task in a request to process a task. In addition, each task handler may also collect central processing unit (CPU) utilization and memory utilization information from multiple sub-data routers. It should be noted that CPU utilization and memory utilization may be considered interchangeable with CPU capacity and memory capacity, respectively. In particular, once a sub-data router's CPU or memory "utilization" is known, since each task handler also knows the overall capabilities of each sub-data router, the CPU or memory "capacity" of the sub-data router is also known, and vice versa.

In one example, the task handlers buffer or queue incoming tasks until the tasks are assigned. Each task handler may then determine the sub-data router that can optimally service the oldest requested task or the next task to be processed within the task handler's own buffer. For instance, a task handler may have a buffer of tasks that is 32 deep. The task handler may look at the oldest task, or the next task to be assigned based on some other criteria, such as a priority rank of a requesting machine, a priority rank based upon the type of request, and so forth. The task handler may note the CPU utilization and memory utilization estimates for the task and search among the sub-data routers for an optimal sub-data router to service the task. In one example, the estimated CPU utilization and memory utilization may be independently scored, e.g., in terms of megahertz (MHz) and megabytes (MB), on a scale of 1-10, 1-100, etc. In one example, the anticipated size of the dataset and the type of processing involved may be used to set these scores.

In one example, a task handler looks for a sub-data router with the lowest CPU utilization (or greatest spare CPU capacity), but then uses the sub-data router's memory utilization (or capacity) as a rejecting filter prior to forwarding the task. For example, there may be two sub-data routers (for illustrative purposes with equal or substantially equal total CPU and memory capabilities). The first sub-data router may have a 10% CPU utilization and 80% memory utilization and the second sub-data router may have a 40% CPU utilization and 20% memory utilization. If the next task in the buffer of the task handler is estimated to require 40% of CPU and 30% of memory for processing, the task handler would identify the first sub-data router as an initial candidate for processing the task, since the first sub-data router has the lower CPU utilization. However, the task handler would determine that the first sub-data router's memory utilization is currently too high to service the task. Therefore, the handler would next consider the second sub-data router and determine that the second sub-data router has sufficient capacity in terms of both CPU and memory utilizations to process the task. Thus, the task may be assigned to the second sub-data router. It should be noted that memory utilization may be considered a more limiting factor than CPU utilization because swapping memory contents with storage is costly in terms of both time and CPU usage. Accordingly, in another example, a task handler may first identify a sub-data router with a lowest memory utilization, and then use the CPU utilization as a rejecting criteria. In any event, once the task handler assigns the task to a sub-data router, the task handler may remove the task from its buffer.

In another example, a task handler may select a sub-data router with an initial criteria of a current CPU utilization (or a memory utilization) that matches the estimated demand of the task. For instance, the optimum use of sub-data routers may be achieved when the tasks are sent to sub-data routers that are the "best fit." In an illustrative example, there may be two tasks to be assigned within a system having two identical or substantially similar sub-data routers. The first task may have an estimate of needing 30% of CPU and the second task may have an estimate of 60%. Assuming the first sub-data router has 65% CPU capacity and the second sub-data router has 45%, if the first task is assigned to the first sub-data router, it will be processed without issue, since there is plenty of CPU capacity. However, the second task has an estimate of 60% CPU utilization, while the second sub-data router only has 45% spare CPU capacity. Thus, if the second task is assigned to the second sub-data router, processing of all operations at the second sub-data router may be delayed. On the other hand, if the first task is instead assigned to the second sub-data router, the first task should be processed without issue since the second sub-data router has sufficient CPU capacity (assuming in the present example that it also has enough memory resources). In addition, the second task may be assigned to the first sub-data router, which still has sufficient CPU resources to handle the estimated CPU utilization of the second task.

In one example, the optimal distribution of tasks to sub-data routers may be achieved by the task handlers assigning each task to the sub-data router that has just enough CPU capacity to fulfill the estimated CPU utilization. In one example, this is objectively achieved by the task handler identifying the sub-data router with the lowest CPU capacity that is still sufficient to meet the estimated CPU utilization of the task, and assigning the task to that sub-data router if the memory capacity of that sub-data router is also sufficient to meet the estimated memory utilization for the task. If the memory capacity is insufficient, the task handler may then consider a second sub-data router with a next lowest CPU capacity that is still sufficient to meet the estimated CPU utilization of the task (noting that the second sub-data router may have a greater spare CPU capacity than the first sub-data router to be considered). As mentioned above, in one example, memory utilization may be considered a more limiting factor than CPU utilization. Accordingly, in another example, a task handler may select a sub-data router with a lowest memory utilization that is still sufficient to meet the estimated memory utilization of the task, and assign the task to the sub-data router if the CPU capacity of the sub-data router is also sufficient to meet the estimated CPU utilization for the task.

In one example, latencies in the system may also be taken into account for various purposes. For instance, task handlers may have a view of the transit time between various requesting machines and various sub-data routers. The latency may be impacted by the links and/or networks between a requesting machine and a sub-data router that may receive the task. Queuing/buffering in the task handlers and/or sub-data routers may also add to the latency. In any case, the task handlers may track the latency impacts of various tasks with respect to various requesting machine/sub-data router pairings over time to use in predicting latencies associated with future requests to process tasks. Thus, the latency can also be included in the determination of which sub-data router should be assigned a task.

In one example, latency estimates may also be used in additional aspects. In particular, it is possible that some smaller tasks may be sitting behind larger tasks in a buffer of a task handler. In one example, small requests may be assigned to the lowest latency sub-data router, even if the sub-data router is approaching its limits. In one example, small requests may also bypass buffering/queuing in the task handlers and/or in the sub-data routers. In particular, it may take CPU time to buffer a request/task. It may also involve CPU time to perform various computations to assign the task. In addition, at the sub-data router side, it may take CPU time to buffer/queue the task, send a notification of the buffering to the sending task handler, and so forth, which could take even more time and resources than to simply perform the task. Thus, in one example there is two aspects of assigning a task to a sub-data router. A request/task over a threshold is optimally assigned based upon CPU and memory utilization estimates of the task and CPU and memory capacities of the sub-data routers, while a request/task under a threshold of anticipated CPU and/or memory utilization may simply be assigned to the sub-data router with the lowest latency path. In one example, a threshold CPU utilization and/or memory utilization may be set to differentiate "small" tasks from other tasks. In another example, a threshold that defines the size of a "small" task may be stated in terms of whether its size is such that processing the task would be faster or use less resources than the messaging that would be involved in sending a notification that the sub-data router is busy.

In one example, the present disclosure may include a mechanism to avoid conflicts between task assignments from different task handlers. Although it may be assumed that a task handler will only assign a task to a sub-data router with the capability to process the task, in some cases two task handlers may attempt to assign tasks to the same sub-data router at or around the same time, where the sub-data router may be unable to process both requests simultaneously. In one example, the sub-data routers may also include queues for temporarily storing tasks awaiting processing. In the event a sub-data router is not able to process all requests that it has been assigned, the sub-data router may select one or more of the tasks to be processed, and may send a notification to the task handler(s) of one or more other tasks that are queued. If a task handler receives such a notification, the task handler may then select a different sub-data router to reassign the task, or may simply allow the sub-data router to process the task in the order in which it is queued. In the event the task handler reassigns the task, the sub-data router that queued the task may be notified so that the task may be removed from the queue at the sub-data router. In another example, task handlers may be rank ordered, and a sub-data router may select which of two or more conflicting tasks to process first in accordance with the rank of the sending task handler. The rank may be substantially fixed, or may rotate based upon which task handler most recently assigned a task, which task handler has waited the longest since last sending a task, and so forth.

In still another example, a task handler may consider latencies between itself and the other task handlers. For example, when the task handler makes a decision to send a particular task to a particular sub-data router, the task handler may first send a notification to the other task handlers. Since it may know the longest latency to reach a farthest of the other task handlers (e.g., in terms of distance or latency/time of communication), the task handler may delay sending the task to the sub-data router for such duration of time. If a conflict occurs where two or more task handlers send a notification of an intention to send a task to the same sub-data router, the task handlers can then resolve the conflict. For instance, a task handler that has recently deferred to other task handlers for other conflicting task assignments may receive a greater priority ranking in determining whether its task should take precedence in resolving a current conflict. In another example, the task from the closest or lowest latency task handler with respect to the sub-data router may take precedence.

In accordance with the present disclosure, requesting machines do not need to know anything about the set of task handlers or the set of sub-data routers. In one example, each requesting machine sends its requests to one task handler. In one example, a second task handler may be identified as a redundancy backup. Each task handler is able to buffer/queue requests from multiple requesting machines. Therefore, the requesting machines assigned to a particular task handler do not have to wait on the task handler while the task handler is momentarily busy. In addition each sub-data router is optimally utilized so that no single sub-data router is over-burdened while others are relatively idle. The architecture supports automatic, relatively uniform distribution of tasks during demand spikes. In addition, due to a more even distribution of tasks, the total amount of sub-data router resources may be lessened, thereby improving initial capital outlays, maintenance costs, and facilities costs. These and other aspects of the present disclosure are discussed in greater detail below in connection with the examples of FIGS. 1-4.

Figure 1:
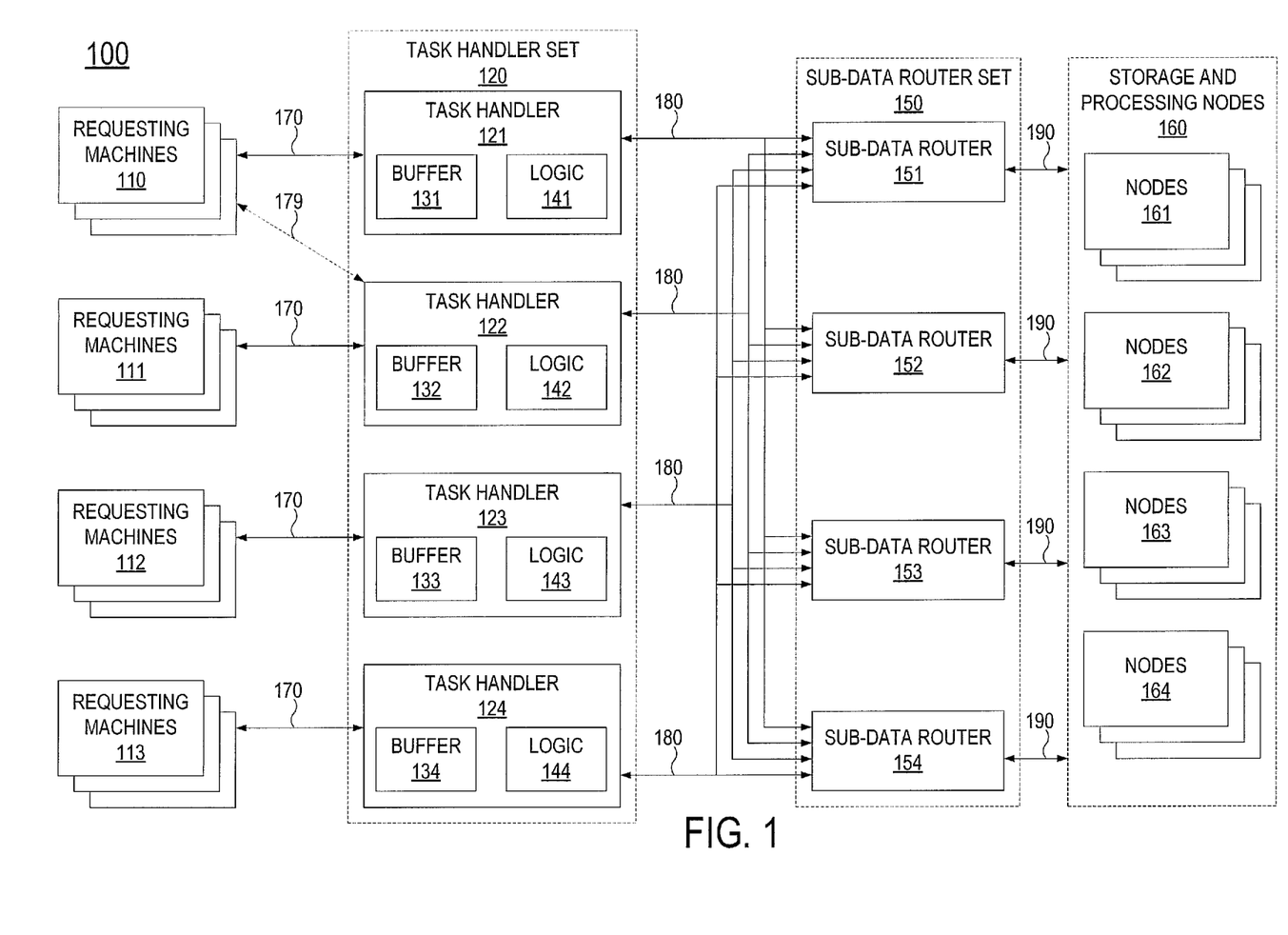
FIG. 1 illustrates an example network or system related to the present disclosure.

To aid in understanding the present disclosure, FIG. 1 illustrates a block diagram depicting one example of a network or system 100 suitable for performing or enabling the steps, functions, operations and/or features described herein. As illustrated in FIG. 1, system 100 may comprise groups of requesting machines 110-113, a task handler set 120 comprising task handlers 121-124, a sub-data router set 150 comprising sub-data routers 151-154, and storage and processing nodes 160, which may include several groups of nodes 161-164. Each of the groups of requesting machines 110-113 may be assigned to a respective task handlers 121-124 in the task handler set 120. Alternatively, or in addition, task handlers 121-124 may be designated for different groups of requesting machines 110-113. The groups of requesting machines 110-113 and task handlers 121-124 are illustrated as being connected via links 170 (and link 179). In one example, links 170 and link 179 represent any physical connections that may be made directly or indirectly between computing devices. Thus, links 170 and link 179 may represent electrical or optical wiring between machines, a wireless physical layer, one or more networks, and so forth. Links 180 between the task handlers 121-124 and sub-data routers 151-154, and links 190 between the sub-data routers 151-154 and the storage and processing nodes 160 may have the same or similar composition. In one example, requesting machines may have a redundant or a failover task handler assigned in the event there is a problem with a primary task handler. For instance, the group of requesting machines 110 may be assigned to task handler 121, while task handler 122 is designated as a backup (reachable via link 179).

The task handlers 121-124 in the task handler set 120 may be co-located, e.g., in a same data center, in a same rack, etc., or may be distributed in various geographically diverse locations. Similarly, each of the sub-data routers 151-154 in sub-data router set 150 may be co-located with one or more other sub-data routers 151-154 in one location or in several different locations. In addition, groups of nodes 161-164 may be in one location, or in several different locations. In one example, the groups of requesting machines 110-113 may be grouped based upon location or based upon another criteria, such as a type of request that is characteristic of the requesting machines in the group. For example, requesting machines 110 may be co-located in one data center, while requesting machines 111 are co-located in another data center. Alternatively, or in addition, requesting machines 110 may be deployed in several different locations in a first region of a country, while requesting machines 111 may be deployed in several different locations in a second region of the country. In still another example, requesting machines 110 may be grouped together based upon the requesting machines 110 generating requests that relate to a first type of file containing a first type of records, while requesting machines 111 may be grouped together based upon the requesting machines 111 generating requests that relate to a second type of file containing a second type of records.

In one example, a requesting machine in one of the groups of requesting machines 110-113 may generate a request to process a task, and forward the request to the respective one of task handlers 121-124. The task may relate to storing files or accessing files stored in the storage and processing nodes 160, manipulating the files or performing operations or transformations on the data contained in the files, creating new files based upon the processing, delivering raw data points, collecting records from multiple locations and correlating the records to make various determinations, aggregating the records to make summary reports, and so on. In one example, the request to process the task may include estimates of a CPU utilization and a memory utilization for the task. In one example, the task handers 121-124 include respective buffers 131-134. In the event that the task handler is currently assigning a task to one of the sub-data routers 151-154, an incoming task may be placed in the respective one of the buffers 131-134. In one example, task handlers 121-124 may simply assign "small" requests without buffering, e.g., to a lowest latency sub-data router in the sub-data router set 150.

As illustrated in FIG. 1, each of the task handlers 121-124 also includes respective logic modules 141-144 for assigning a task to a sub-data router. For instance, in one example, task handlers 121-124 may each comprise a computing device, such as computing device 500 depicted in FIG. 5, specifically configured to provide one or more functions for assigning a task to a sub-data router, in accordance with the present disclosure. In one example, the logic modules 141-144, may configure the respective task handlers 121-124 to select sub-data routers from the sub-data router set 150 based upon the estimated CPU and memory utilizations of various tasks that are requested, and based upon the CPU and memory capacities of the respective sub-data routers 151-154. In this regard, sub-data routers 151-154 may monitor their own statuses and periodically report CPU and memory capacities to the task handlers 121-124.

In one example, the task handlers 121-124 may communicate with one another to determine a priority of making assignments of tasks to sub-data routers in the sub-data router set 150. In one example, task handlers 121-124 may also determine latencies between and among themselves such that a task handler making an assignment to a sub-data router in the sub-data router set 150 may first send a notification to the other task handlers in the task handler set 120, and wait for a certain period of time corresponding to the largest latency associated with another task handler in the task handler set 120 before actually assigning the task to the sub-data router that is selected.

When a task is assigned to one of the sub-data routers 151-154, the sub-data router may process the task if the CPU capacity and the memory capacity of the sub-data router permit such processing. Although it may be assumed that a task handler will only assign a task to a sub-data router with the capability to process the task, in some cases two task handlers may attempt to assign tasks to the same sub-data router at or around the same time, where the sub-data router may be unable to process both requests simultaneously. In one example, the sub-data routers 151-154 may also include queues for temporarily storing tasks awaiting processing. In the event a sub-data router is not able to process all requests that it has been assigned, the sub-data router may select one or more of the tasks to be processed, and may send a notification to the task handler(s) of one or more other tasks that are queued. If a task handler receives such a notification, the task handler may then select a different sub-data router to reassign the task, or may simply allow the sub-data router to process the task in the order in which it is queued. In the event the task handler reassigns the task, the sub-data router that queued the task may be notified so that the task may be removed from the queue at the sub-data router. In one example, sub-data routers 151-154 may simply process "small" requests, without queuing, regardless of the current statuses of the sub-data routers 151-154 in terms of CPU utilization/capacity and memory utilization/capacity.

When processing a task, a sub-data router in the sub-data router set 150 may engage one more of nodes 161-164 in storage and processing nodes 160. For instance, the sub-data router may parse the request and determine that the request needs to access files with blocks stored in one of nodes 161 and in one of nodes 163. The sub-data router may assign the one of nodes 161 and/or the one of nodes 163 to process all or a portion of the blocks in accordance with the task, or may assign a different node to copy the blocks and to process the blocks in accordance with the task. For instance, in one example, the sub-data router may implement a map-reduce algorithm to distribute various operations of the task to multiple nodes and to aggregate the results.

In one example, after a task is processed, a sub-data router may report back to an assigning task handler with the actual CPU and memory utilizations for the task. In addition the actual CPU and memory utilizations, and parameters of the task can be shared among all task handlers in the task handler set 120. Thus, statistics can be collected over all tasks/requests and over all sub-data routers such that it can lead to more accurate estimates of resource requirements of requests for processing future tasks.

It should be noted that the system 100 has been simplified. In other words, the system 100 may be implemented in a different form than that illustrated in FIG. 1. For example, the system 100 may be expanded to include other components (not shown) such as additional groups of requesting machines, additional task handlers, additional sub-data routers, and so forth, without altering the scope of the present disclosure. Similarly, system 100 may omit various elements, substitute elements for components or devices that perform the same or similar functions and/or combine elements that are illustrated as separate components. Thus, these and other modifications of the system 100 are all contemplated within the scope of the present disclosure.

Figure 2:
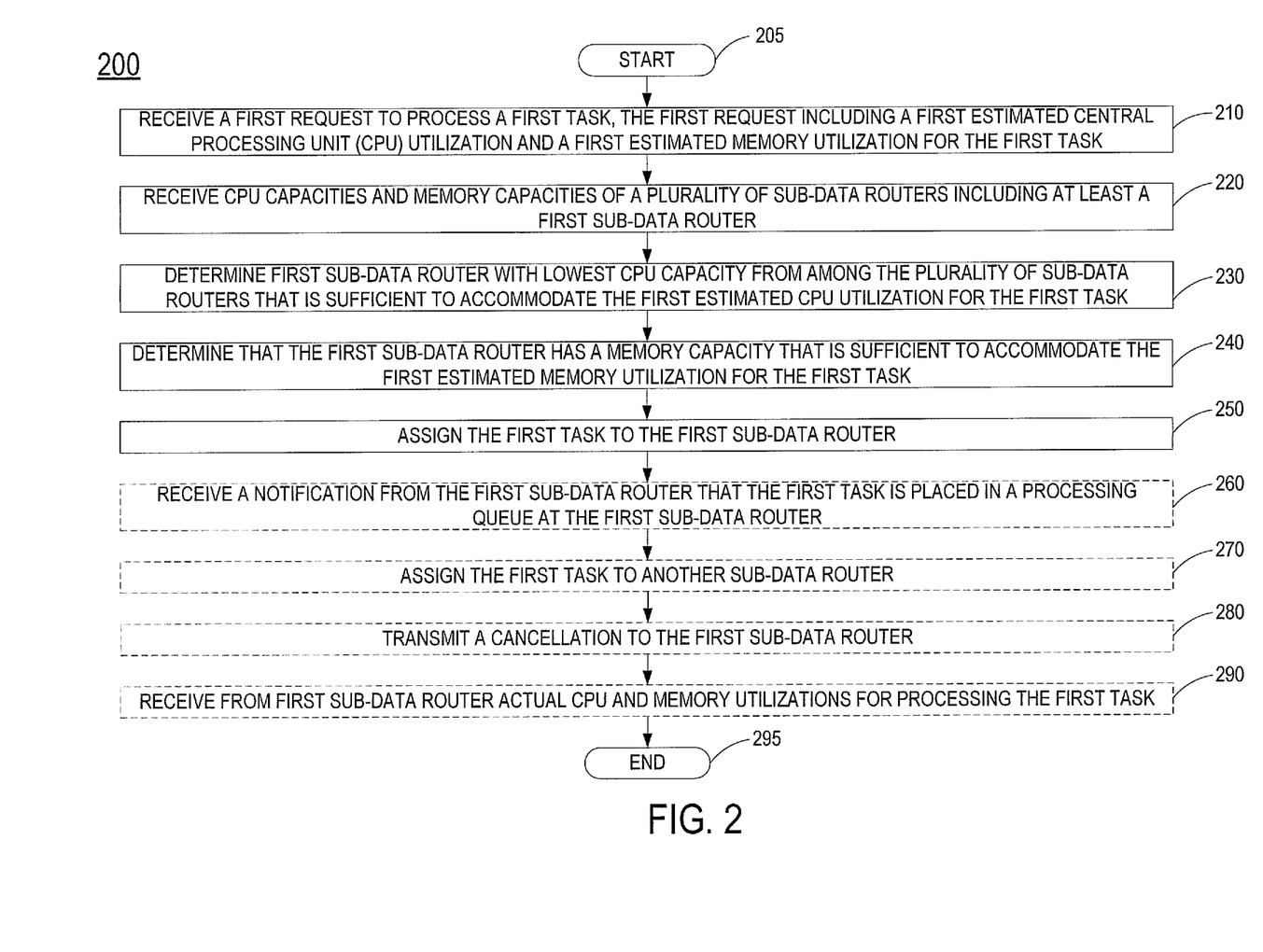
FIG. 2 illustrates a flowchart of an example method for assigning a task to a sub-data router, in accordance with the present disclosure.

FIG. 2 illustrates a flowchart of an example method 200 for assigning a task to a sub-data router, in accordance with the present disclosure. In one example, the steps, functions, or operations of the method 200 may be performed by a task handler, such as one of task handlers 121-124 in FIG. 1. Alternatively, or in addition, in one example, the steps, functions, or operations of method 200 may be performed by a computing device or system 500, and/or processor 502 as described in connection with FIG. 5 below. For example, the processor 502 and memory 504 may represent the hardware logic and a memory storing computer/hardware logic-executable instructions of an example task handler, in accordance with the present disclosure. For illustrative purposes, the method 200 is described in greater detail below in connection with an example performed by a processor, such as processor 502 in FIG. 5. The method begins in step 205 and proceeds to step 210.

At step 210, the processor receives a first request to process a first task, the first request including a first estimated CPU utilization for the first task and a first estimated memory utilization for the first task. The first request may be received from one of a plurality of requesting devices that may be assigned to send task requests to the processor. In one example, the first task is associated with accessing data that is stored in a distributed data storage system. In one example, the first estimated CPU utilization and the first estimated memory utilization are estimated from a knowledge base comprising feedback regarding past tasks as processed via various sub-data routers. For example, sub-data routers may report on the actual CPU and memory utilizations for completed tasks to a plurality of task schedulers within a distributed data storage system, which can result in more accurate estimates for requests for new tasks to be assigned. In one example, the estimated CPU utilization and memory utilization may be independently scored, e.g., in terms of megahertz (MHz) and megabytes (MB), on a scale of 1-10, 1-100, etc. In one example, the anticipated size of the dataset and the type of processing involved may be used to set these scores. In one example, the first request may further include a first latency requirement of the first task.

At step 220, the processor receives CPU capacities and memory capacities of a plurality of sub-data routers including at least a first sub-data router. For instance, the plurality of sub-data routers may monitor their current CPU and memory utilizations (and/or CPU and memory capacities) and report these utilizations/capacities to a plurality of task schedulers of the distributed data storage system. In one example, each of the plurality of sub-data routers includes a list of blocks of the data, or files that are stored in the distributed data storage system, and data nodes of the distributed data storage system where the blocks are located within the distributed data storage system.

At step 230, the processor determines that a first sub-data router has a lowest CPU capacity from among the plurality of sub-data routers that is sufficient to accommodate the first estimated CPU utilization for the first task. For instance, the optimum use of sub-data routers may be achieved when the tasks are sent to sub-data routers that are the "best fit." In one example, the optimal distribution of tasks to sub-data routers may be achieved by the processor assigning the first task to the sub-data router that has just enough CPU capacity to fulfill the estimated CPU utilization. In one example, this is objectively achieved by the processor identifying the sub-data router with the lowest CPU capacity that is still sufficient to meet the estimated CPU utilization of the task. In this case, the sub-data router meeting this criterion is labeled as the first sub-data router (where the term "first" does not imply that it was the first one of the sub-data routers evaluated according the CPU capacity at step 230).

At step 240, the processor determines that the first sub-data router has a memory capacity that is sufficient to accommodate the first estimated memory utilization for the first task. For instance, more optimal processing of the task may occur when the memory capacity of the first sub-data router is also sufficient to meet the estimated memory utilization for the task. If the memory capacity is insufficient, the processor may then consider a different sub-data router with a next lowest CPU capacity that is still sufficient to meet the estimated CPU utilization of the task. However, for purposes of the present example, it is assumed that the memory capacity of the first sub-data router is in fact sufficient to accommodate the first estimated memory utilization for the first task.

At step 250, the processor assigns the first task to the first sub-data router, e.g., when it is determined that the first sub-data router has a CPU capacity that is sufficient to accommodate the first estimated CPU utilization for the first task and when it is determined that the first sub-data router has a memory capacity that is sufficient to accommodate the first estimated memory utilization for the first task. For purposes of the present example it is assumed that the first sub-data router has been determined to meet such criteria at steps 230 and 240. In one example, the first sub-data router may send instructions to at least one data node of the distributed data storage system to perform functions in accordance with the first task.

In one example, the assigning of the first task to the first sub-data router at step 250 may be in accordance with a priority of assignment between the processor and a second task handler. For example, the processor may comprise a processor of a first task handler that is in communication with a plurality of additional task handlers for assigning tasks to the plurality of sub-data routers. The processor may receive a notification from the second task handler of a second task to be assigned by the second task handler and may then determine a priority of assignment between the first task and the second task, and/or between the first task handler and the second task handler. In one example, the priority of assignment may be based upon pre-designated ranks that are provided for the first task handler and for the second task handler. In another example, the priority of assignment may be in accordance with respective times since a last assignment of a task by the processor (e.g., by the first task handler) and a last assignment of a task by the second task handler.

In another example, the assigning of the first task to the first sub-data router may comprise sending a notification to a second task handler (or a plurality of task handlers) of the assigning the first task to the first sub-data router, and sending the first task to the first sub-data router after a hold-off time. In one example, the hold-off time is in accordance with a latency between the processor and the second task handler. For example, the processor may keep track of latencies between different components within the distributed data storage system such that the processor may determine how long it may take for the notification to reach the second task handler. For instance, the second task handler may comprise a task handler that is the furthest (in terms of time/latency) from the processor. If there is no conflicting notification received during the hold-off time, the processor may then continue with sending the first task to the first sub-data router.

In one example, the first task is assigned to the first sub-data router when it is determined that the first sub-data router has a CPU capacity that is sufficient to accommodate the first estimated CPU utilization for the first task, when it is determined that the first sub-data router has a memory capacity that is sufficient to accommodate the first estimated memory utilization for the first task, and when a latency between the device and the first sub-data router is in accordance with a first latency requirement for the first task. For example, as mentioned above, in one example, the first request may further include a first latency requirement of the first task. In addition, in one example, the processor may track latencies between different components within the distributed data storage system such that the processor may determine whether a latency associated with communications to and/or from the first sub-data router is in accordance with the first latency requirement.

Following step 250, the method 200 may proceed to optional step 260, to optional step 290, or to step 295.

At optional step 260, the processor may receive a notification from the first sub-data router that the first task is placed in a processing queue at the first sub-data router. For example, as mentioned above, it may be possible for two tasks to be assigned to a sub-data router at or around the same time, which the sub-data router may not be able to simultaneously process in accordance with its CPU capacity and/or its memory capacity. Thus, in one example the first sub-data router may queue/buffer the first task and send a notification to the processor.

At optional step 270, the processor may assign the first task to a second sub-data router of the plurality of sub-data routers. For instance, the processor may determine that the first task should not await processing in the queue of the first sub-data router, but should be reassigned to a sub-data router that may begin processing the task immediately (i.e., without queuing). The processor may evaluate other sub-data routers according to the same criteria as described above in connection with steps 230 and 240, while omitting the first sub-data router from consideration. If another sub-data router (e.g., labeled as a "second sub-data router") is found that has sufficient CPU and memory capacity, and that can process the first task without queuing, the processor may reassign the first task to that sub-data router.

At optional step 280, the processor may transmit a cancellation regarding the first task to the first sub-data router. Accordingly, the first-sub data router may remove the first task from the queue and free resources for additional tasks. Following optional step 280, the method 200 may proceed to step 290.

At optional step 290, the processor may receive from the first sub-data router an actual CPU utilization and the actual memory utilization for processing the first task. For instance, the actual CPU utilization and an actual memory utilization for processing the first task may be used in calculating a second estimated CPU utilization for a second task and a second estimated memory utilization for the second task. In addition, the processor may share the actual CPU utilization and the actual memory utilization for processing the first task with a plurality of task handlers. As such, the task handlers may collectively improve the accuracy of estimates for CPU utilizations and memory utilizations of new tasks to be assigned to sub-data routers.

Following optional step 290, the method 200 proceeds to step 295. At step 295, the method 200 ends. However, it should be noted that in one example, the method 200 may be expanded to include additional steps, functions, or operations. For instance, the steps, functions, or operations of the method 400 of FIG. 4, described in greater detail below, may comprise an extension of the method 200.

Figure 3:
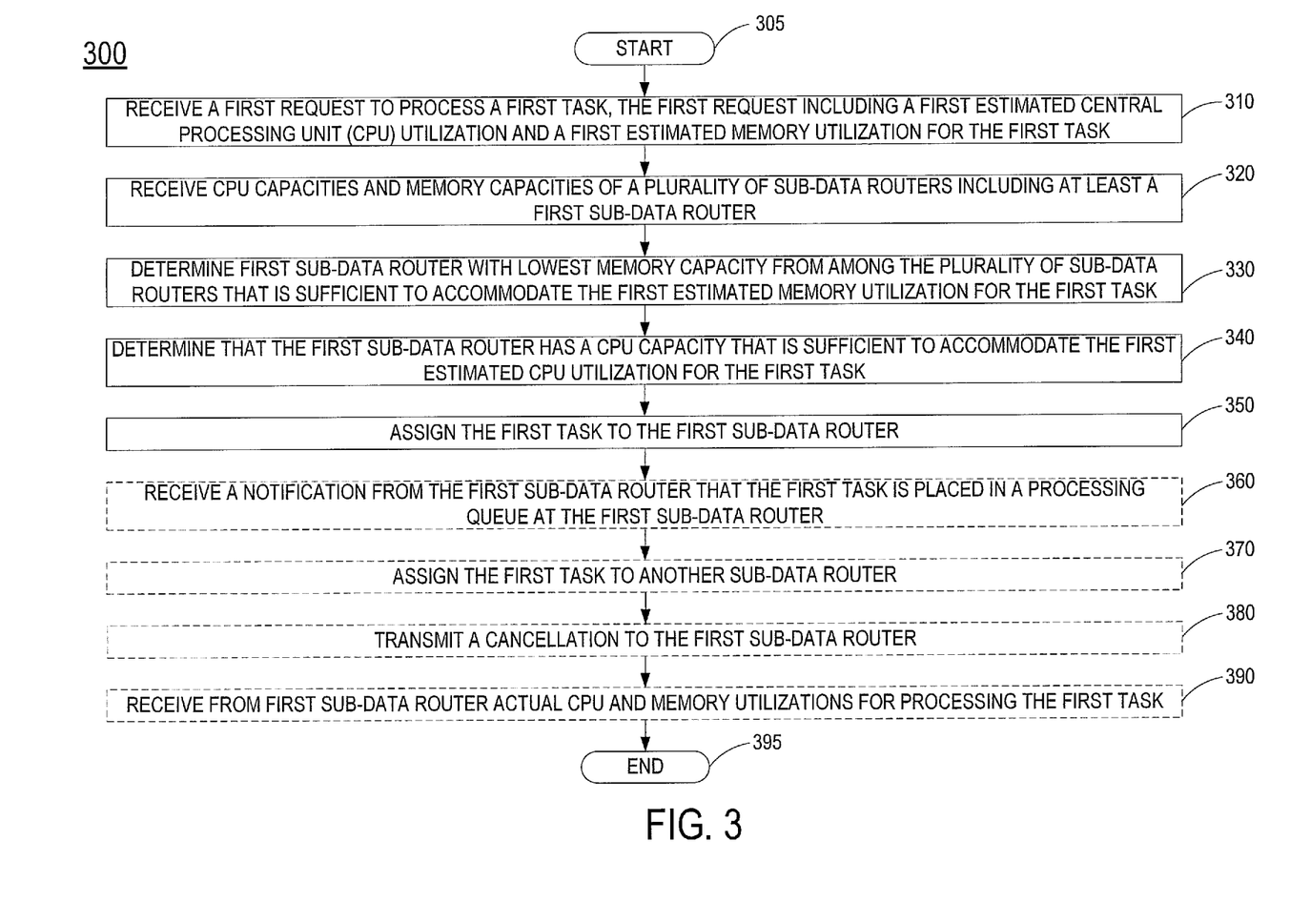
FIG. 3 illustrates a flowchart of an additional example method for assigning a task to a sub-data router, in accordance with the present disclosure.

FIG. 3 illustrates a flowchart of an additional example method 300 for assigning a task to a sub-data router, in accordance with the present disclosure. In one example, the steps, functions, or operations of the method 300 may be performed by a task handler, such as one of task handlers 121-124 in FIG. 1. Alternatively, or in addition, in one example, the steps, functions, or operations of method 300 may be performed by a computing device or system 500, and/or processor 502 as described in connection with FIG. 5 below. For example, the processor 502 and memory 504 may represent the hardware logic and a memory storing computer/hardware logic-executable instructions of an example task handler, in accordance with the present disclosure. For illustrative purposes, the method 300 is described in greater detail below in connection with an example performed by a processor, such as processor 502 in FIG. 5.

It should be noted that in one example, the method 300 is similar to the method 200 discussed above. However, the method 300 may first identify a sub-data router with a lowest memory capacity that is still sufficient to accommodate an estimated memory utilization of a task, and then use an estimated CPU utilization of the task and a CPU capacity of the sub-data router as the rejecting criteria. The method begins in step 305 and proceeds to step 310.

At step 310, the processor receives a first request to process a first task, the first request including a first estimated CPU utilization for the first task and a first estimated memory utilization for the first task. In one example, the first task is associated with accessing data that is stored in a distributed data storage system. In one example the first request may further include a first latency requirement of the first task. In one example, step 310 may comprise the same or substantially similar operations to that which is described above in connection with step 210 of the method 200.

At step 320, the processor receives CPU capacities and memory capacities of a plurality of sub-data routers including at least a first sub-data router. For instance, the plurality of sub-data routers may monitor their current CPU and memory utilizations (and/or CPU and memory capacities) and report these utilizations/capacities to a plurality of task schedulers of the distributed data storage system. In one example, step 320 may comprise the same or substantially similar operations to that which is described above in connection with step 220 of the method 200.

At step 330, the processor determines that a first sub-data router has a lowest memory capacity from among the plurality of sub-data routers that is sufficient to accommodate the first estimated memory utilization for the first task. In this case, the sub-data router meeting this criterion is labeled as the first sub-data router (where the term "first" does not imply that it was the first one of the sub-data routers evaluated according the memory capacity at step 330).

At step 340, the processor determines that the first sub-data router has a CPU capacity that is sufficient to accommodate the first estimated CPU utilization for the first task. For instance, more optimal processing of the task may occur when the memory capacity of the first sub-data router is also sufficient to meet the estimated CPU utilization for the task. If the CPU capacity is insufficient, the processor may then consider a different sub-data router with a next lowest memory capacity that is still sufficient to meet the estimated memory utilization of the task. However, for purposes of the present example, it is assumed that the CPU capacity of the first sub-data router is in fact sufficient to accommodate the first estimated CPU utilization for the first task.

At step 350, the processor assigns the first task to the first sub-data router, e.g., when it is determined that the first sub-data router has the a memory capacity that is sufficient to accommodate the first estimated memory utilization for the first task and when it is determined that the first sub-data router has a CPU capacity that is sufficient to accommodate the first estimated CPU utilization for the first task. For purposes of the present example it is assumed that the first sub-data router has been determined to meet such criteria at steps 330 and 340. The first sub-data router may send instructions to at least one data node of the distributed data storage system to perform functions in accordance with the first task.

In one example, the assigning of the first task to the first sub-data router at step 350 may be in accordance with a priority of assignment between the device and a second task handler (e.g., as described above in connection with step 250 of the method 200). In another example, the assigning of the first task to the first sub-data router may comprise sending a notification to a second task handler (or a plurality of task handlers) of the assigning the first task to the first sub-data router, and sending the first task to the first sub-data router after a hold-off time (e.g., as described above in connection with step 250 of the method 200). Alternatively, or in addition, in one example, the first task is assigned to the first sub-data router when it is determined that the first sub-data router has a memory capacity that is sufficient to accommodate the first estimated memory utilization for the first task, when it is determined that the first sub-data router has a CPU capacity that is sufficient to accommodate the first estimated CPU utilization for the first task, and when a latency between the device and the first sub-data router is in accordance with a first latency requirement for the first task. Following step 350, the method 300 may proceed to optional step 360, to optional step 390, or to step 395.

At optional step 360, the processor may receive a notification from the first sub-data router that the first task is placed in a processing queue at the first sub-data router. In one example, step 360 may comprise the same or substantially similar operations to that which is described above in connection with step 260 of the method 200.

At optional step 370, the processor may assign the first task to a second sub-data router of the plurality of sub-data routers. In one example, step 370 may comprise the same or substantially similar operations to that which is described above in connection with step 270 of the method 200.

At optional step 380, the processor may transmit a cancellation regarding the first task to the first sub-data router. In one example, step 380 may comprise the same or substantially similar operations to that which is described above in connection with step 280 of the method 200. Following optional step 380, the method 300 may proceed to step 390.

At optional step 390, the processor may receive from the first sub-data router an actual CPU utilization and an actual memory utilization for processing the first task. In one example, step 390 may comprise the same or substantially similar operations to that which is described above in connection with step 290 of the method 200.

Following step 390, the method 300 proceeds to step 395. At step 395, the method 300 ends. However, it should be noted that in one example, the method 300 may be expanded to include additional steps, functions, or operations. For instance, the steps, functions, or operations of the method 400 of FIG. 4, described in greater detail below, may comprise an extension of the method 300.

Figure 4:
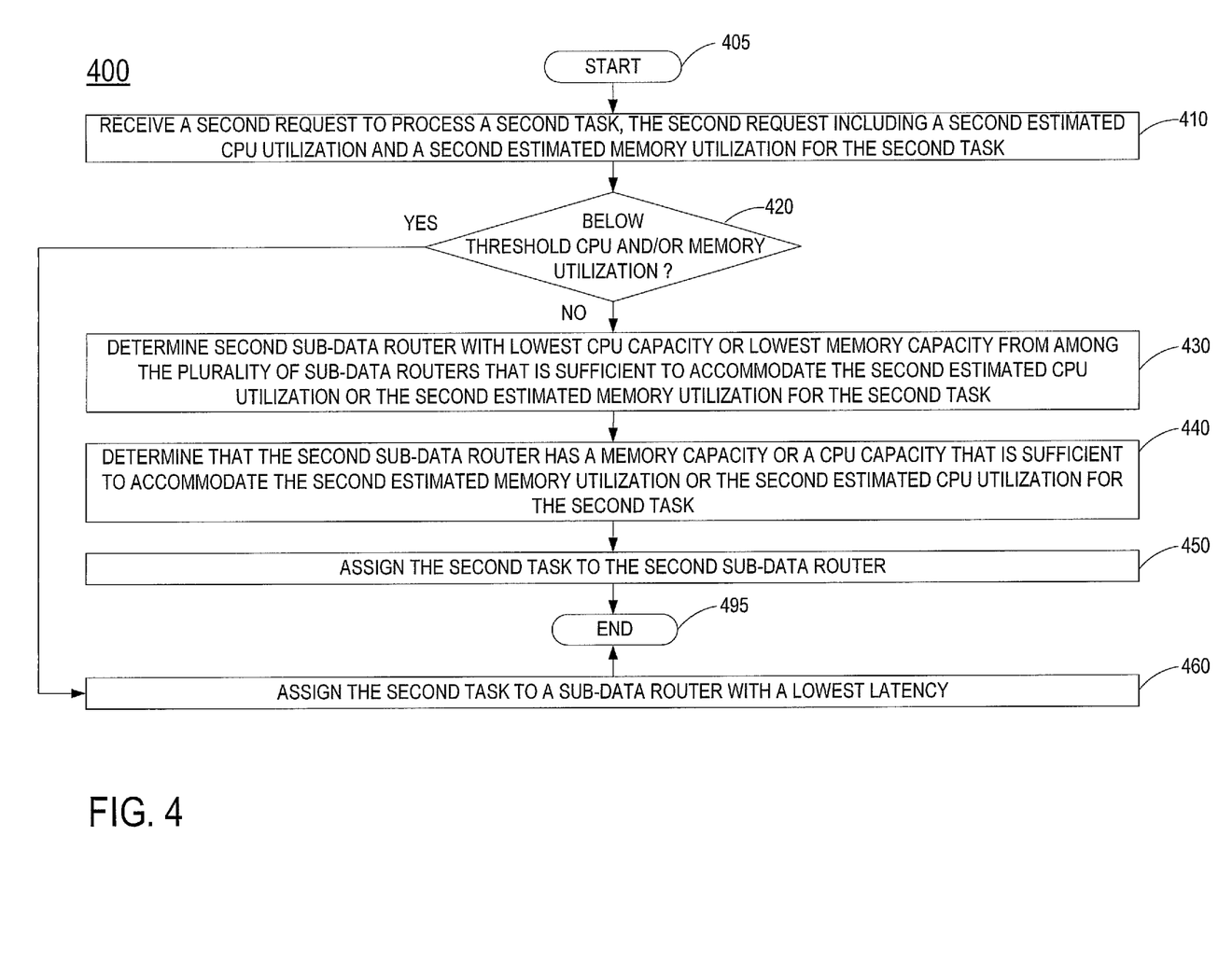
FIG. 4 illustrates a flowchart of an example method of further operations for assigning a task to a sub-data router, in accordance with the present disclosure.

FIG. 4 illustrates a flowchart of an example method 400 of further operations for assigning a task to a sub-data router, in accordance with the present disclosure. For instance, the method 400 may comprise an extension of the method 200 or the method 300 described above. In other words, the steps, functions, or operations of the method 400 may be considered optional or additional steps in connection with the above-described method 200 or method 300. In one example, the steps, functions, or operations of the method 400 may be performed by a task handler, such as one of task handlers 121-124 in FIG. 1. Alternatively, or in addition, in one example, the steps, functions, or operations of method 400 may be performed by a computing device or system 500, and/or processor 502 as described in connection with FIG. 5 below. For illustrative purposes, the method 400 is described in greater detail below in connection with an example performed by a processor, such as processor 502 in FIG. 5.

At step 410, the processor receives a second request to process a second task, the second request including a second estimated CPU utilization for the second task and a second estimated memory utilization for the second task. It should be noted that the processor may receive a first request to process a first task in accordance with step 210 of the method 200 or step 310 of the method 300, as described above.

At step 420, the processor determines whether the second estimated CPU utilization for the second task is below a threshold central processing unit utilization and/or whether the second estimated memory utilization for the second task is below a threshold memory utilization. For instance, as mentioned above "small" requests/tasks may be assigned to the lowest latency sub-data router, even if the sub-data router is approaching its limits. Thus, the threshold(s) may be set to distinguish "small" requests/tasks from other requests. If one or both of the thresholds is satisfied, the method 400 may proceed to step 460. Otherwise, the method 400 may proceed to step 430.

At step 430, the processor determines a second sub-data router of the plurality of sub-data routers with a lowest CPU capacity or a lowest memory capacity from among the plurality of sub-data routers that is sufficient to accommodate the second estimated CPU utilization or the second estimated memory utilization for the second task. For instance, if the method 400 is performed in connection with the method 200, step 430 may comprise determining a second sub-data router of the plurality of sub-data routers with a lowest CPU capacity from among the plurality of sub-data routers that is sufficient to accommodate the second estimated CPU utilization for the second task. However, if the method 400 is performed in connection with the method 300, step 430 may comprise determining a second sub-data router of the plurality of sub-data routers with a lowest memory capacity from among the plurality of sub-data routers that is sufficient to accommodate the second estimated memory utilization for the second task. It should be noted that in some cases, the "second sub-data router" that is identified at step 430 may comprise a same sub-data router as the "first sub-data router" that is determined at step 220 of the method 200 or step 320 of the method 300, e.g., depending upon the relative capacities of the plurality of sub-data routers in the distributed data storage system.

At step 440, the processor determines that the second sub-data router has a memory capacity or a CPU capacity that is sufficient to accommodate the second estimated memory utilization or the second estimated CPU utilization for the second task. For instance, if the method 400 is performed in connection with the method 200, step 440 may comprise determining that the second sub-data router has a memory capacity that is sufficient to accommodate the second estimated memory utilization for the second task. However, if the method 400 is performed in connection with the method 300, step 440 may comprise determining that the second sub-data router has a CPU capacity that is sufficient to accommodate the second estimated CPU utilization for the second task.

At step 450, the processor assigns the second task to the second sub-data router, e.g., when the CPU capacity and the memory capacity of the second sub-data router are determined at steps 430 and 440 to be sufficient to accommodate the second estimated CPU utilization and the second estimated memory utilization for the second task. In one example, step 450 may comprise similar operations to that which is described above in connection with step 250 of the method 200 or step 350 of the method 300, e.g., regarding the assigning of a first task to a first sub-data router. Following step 450, the method 400 may proceed to step 495.

At step 460, the processor assigns the second task to a sub-data router with a lowest latency from among the plurality of sub-data routers. For instance, as mentioned above "small" requests may be assigned to the lowest latency sub-data router, even if the sub-data router is approaching its limits. It should be noted that the "second sub-data router" that is assigned at step 460 may comprise a same sub-data router as the "first sub-data router" that is assigned at step 250 of the method 200 or at step 350 of the method 300, e.g., depending upon the relative latencies among components within the distributed data storage system.

Following step 460, the method 400 proceeds to step 495. At step 495, the method 400 ends.

It should be noted that although not specifically specified, one or more steps, functions or operations of the respective methods 200, 300, and 400 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIGS. 2-4 that recite a determining operation or involve a decision do not necessarily require that both branches of the determining operation be practiced. In other words, one of the branches of the determining operation can be deemed as an optional step. In addition, one or more steps, blocks, functions, or operations of the above described methods 200, 300, and 400 may comprise optional steps, or can be combined, separated, and/or performed in a different order from that described above, without departing from the example embodiments of the present disclosure.

Figure 5:
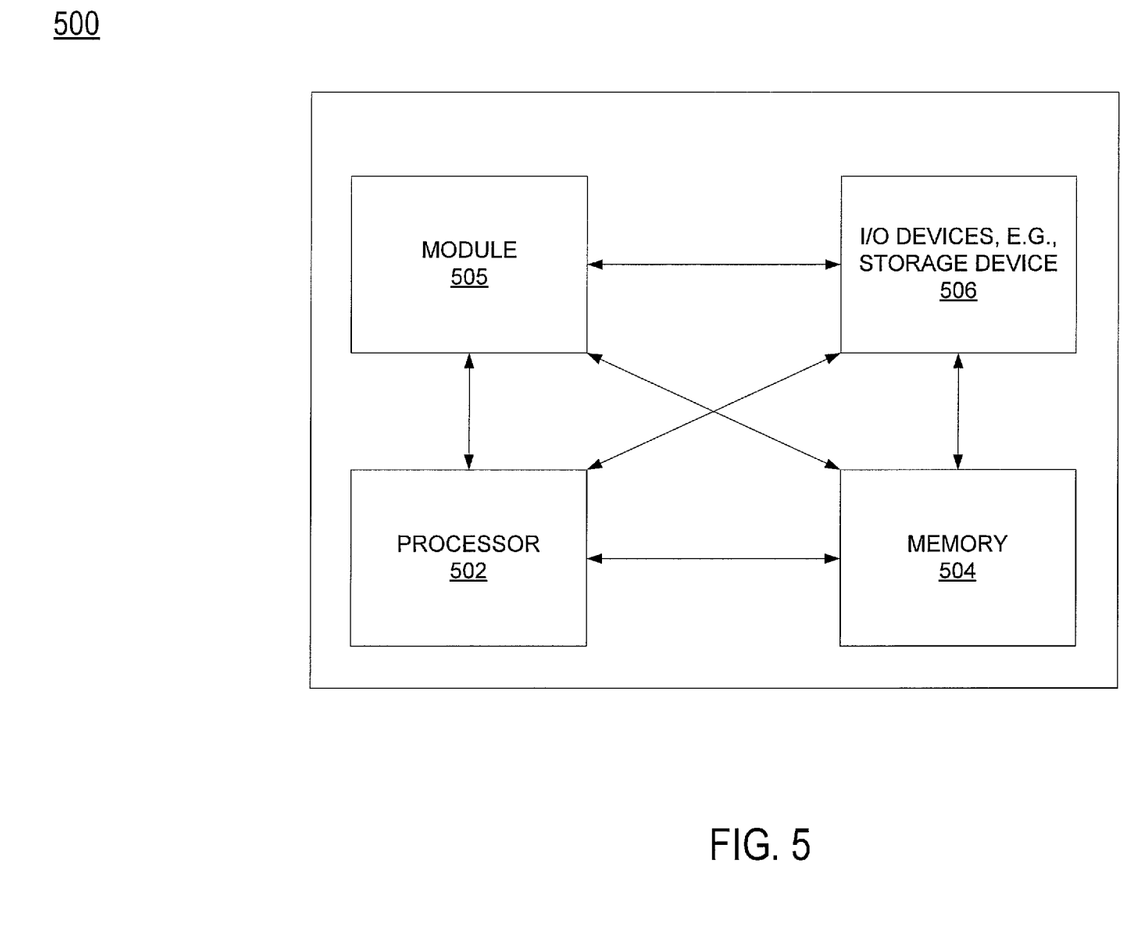
FIG. 5 illustrates an example high-level block diagram of a computer specifically programmed to perform the steps, functions, blocks, and/or operations described herein.

FIG. 5 depicts a high-level block diagram of a computing device suitable for use in performing the functions described herein. As depicted in FIG. 5, the system 500 comprises one or more hardware processor elements 502 (e.g., a central processing unit (CPU), a microprocessor, or a multi-core processor, hardware logic, and so forth), a memory 504 (e.g., random access memory (RAM) and/or read only memory (ROM)), a module 505 for assigning a task to a sub-data router, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200, method 300, or method 400 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device, or any other hardware equivalents, e.g., computer readable instructions pertaining to the methods discussed above can be used to configure a hardware processor to perform the steps, functions and/or operations of the above disclosed method 200, method 300, or method 400. In one example, hardware processor element 502 may function as a memory management unit of the present disclosure when used in conjunction with computer/hardware logic-executable code or instructions. For instance, instructions and data for the present module or process 505 for assigning a task to a sub-data router (e.g., a software program comprising computer-executable instructions) can be loaded into memory 504 and executed by hardware processor element 502 to implement the steps, functions or operations as discussed above in connection with the illustrative method 200, method 300, or method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 505 for assigning a task to a sub-data router (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
   a processor; and
   a computer-readable medium storing instructions which, when executed by the processor, cause the processor to perform operations of a first task handler, the operations comprising:
   receiving a first request for processing of a first task, the first request including a first estimated central processing unit utilization for executing the first task on at least one sub-data router of a plurality of sub-data routers and a first estimated memory utilization for executing the first task on the at least one sub-data router, the first task, when executed on the at least one sub-data router of the plurality of sub-data routers, comprising the at least one sub-data router accessing at least a portion of a file stored in a distributed data storage system;

periodically receiving a respective central processing unit capacity and a respective memory capacity of each of the plurality of sub-data routers, the plurality of sub-data routers including at least the first sub-data router;

determining that a first sub-data router has a lowest central processing unit capacity from among the plurality of sub-data routers that is sufficient to accommodate the first estimated central processing unit utilization for the first task;

determining that the first sub-data router has a memory capacity that is sufficient to accommodate the first estimated memory utilization for the first task, the first estimated memory utilization comprising an estimated quantity of memory that at least one central processing unit of the first-sub data router is to use for at least instructions and data for the processing of the first task, the processing of the first task comprising the first sub-data router identifying at least one data node having the at least the portion of the file stored in the distributed data storage system and the first sub-data router sending instructions to the at least one data node of the distributed data storage system that is identified to perform at least one function associated with the accessing of the at least the portion of the file stored in the distributed data storage system in accordance with the first task; and sending the first task to the first sub-data router based on the determining that the first sub-data router has the lowest central processing unit capacity that is sufficient and the determining that the first sub-data router has the memory capacity that is sufficient for the processing of the first task, the processing of the first task comprising the first sub-data router identifying at least one data node having the at least the portion of the file stored in the distributed data storage system and the first sub-data router sending instructions to the at least one data node of the distributed data storage system that is identified to perform at least one function associated with the accessing of the at least the portion of the file stored in the distributed data storage system in accordance with the first task.

2. The device of claim 1, wherein the operations further comprise:
receiving a second request to process a second task, the second request including a second estimated central processing unit utilization for the second task and a second estimated memory utilization for the second task.

3. The device of claim 2, wherein the operations further comprise:
determining, in accordance with the sending of the first task to the first sub-data router, that a second sub-data router of the plurality of sub-data routers has a current lowest central processing unit capacity from among the plurality of sub-data routers that is sufficient to accommodate the second estimated central processing unit utilization for the second task;

determining that the second sub-data router has a memory capacity that is sufficient to accommodate the second estimated memory utilization for the second task; and sending the second task to the second sub-data router based on the determining that the second sub-data router has the current lowest central processing unit capacity that is sufficient and the determining that the second sub-data router has the memory capacity that is sufficient.

4. The device of claim 2, wherein the operations further comprise:
determining that the second estimated central processing unit utilization for the second task is below a threshold central processing unit utilization;

determining that the second estimated memory utilization for the second task is below a threshold memory utilization; and sending the second task to a sub-data router with a lowest latency from among the plurality of sub-data routers.

5. The device of claim 1, wherein the first request further includes a first latency requirement of the first task, wherein the first task is sent to the first sub-data router when it is determined that: the first sub-data router has the lowest central processing unit capacity that is sufficient to accommodate the first estimated central processing unit utilization for the first task, the first sub-data router has the memory capacity that is sufficient to accommodate the first estimated memory utilization for the first task, and a latency between the device and the first sub-data router is in accordance with the first latency requirement.

6. The device of claim 1, wherein the device comprises the first task handler, and wherein the sending of the first task to the first sub-data router is in accordance with a priority of assignment between the first task handler and a second task handler.

7. The device of claim 6, wherein the priority of assignment is based upon pre-designated ranks that are provided for the first task handler and for the second task handler.

8. The device of claim 6, wherein the priority of assignment is in accordance with respective times since a last sending of a task by the first task handler and a last sending of a task by the second task handler.

9. The device of claim 1, wherein the operations further comprise:
receiving a notification from the first sub-data router that the first task is placed in a processing queue at the first sub-data router.

10. The device of claim 9, wherein the operations further comprise:
sending the first task to a second sub-data router of the plurality of sub-data routers; and
transmitting a cancellation regarding the first task to the first sub-data router.

11. The device of claim 1, wherein the device comprises the first task handler for sending tasks to the plurality of sub-data routers, and wherein the sending the first task to the first sub-data router comprises:
sending a notification to a second task handler of the sending of the first task to the first sub-data router; and
sending the first task to the first sub-data router after a hold-off time.

12. The device of claim 11, wherein the hold-off time is in accordance with a latency between the first task handler and the second task handler.

13. The device of claim 1, wherein each of the plurality of sub-data routers includes a list of blocks of files that are stored in data nodes of the distributed data storage system.

14. The device of claim 1, wherein the device comprises the first task handler for sending tasks from a first plurality of requesting devices to the plurality of sub-data routers, wherein at least a second task handler is for sending tasks from a second plurality of requesting devices to the plurality of sub-data routers.

15. The device of claim 1, wherein the operations further comprise:
receiving, from the first sub-data router, an actual central processing unit utilization and an actual memory utilization for the processing of the first task, wherein the actual central processing unit utilization and the actual memory utilization for the processing of the first task are used in calculating a second estimated central processing unit utilization for a second task and a second estimated memory utilization for the second task.

16. A device comprising:
a processor; and
a computer-readable medium storing instructions which, when executed by the processor, cause the processor to perform operations of a first task handler, the operations comprising:
receiving a first request for processing a first task, the first request including a first estimated central processing unit utilization for executing the first task on at least one sub-data router of a plurality of sub-data routers and a first estimated memory utilization for executing the first task on the at least one sub-data router, the first task, when executed on the at least one sub-data router of the plurality of sub-data routers, comprising the at least one sub-data router accessing at least a portion of a file stored in a distributed data storage system;
periodically receiving a respective central processing unit capacity and a respective memory capacity of each of the plurality of sub-data routers, the plurality of sub-data routers including at least the first sub-data router;
determining that a first sub-data router has a lowest memory capacity from among the plurality of sub-data routers that is sufficient to accommodate the first estimated memory utilization for the first task, the first estimated memory utilization comprising an estimated quantity of memory that at least one central processing unit of the first-sub data router is to use for at least instructions and data for the processing of the first task, the processing of the first task comprising the first sub-data router identifying at least one data node having the at least the portion of the file stored in the distributed data storage system and the first sub-data router sending instructions to the at least one data node of the distributed data storage system that is identified to perform at least one function associated with the accessing of the at least the portion of the file stored in the distributed data storage system in accordance with the first task;
determining that the first sub-data router has a central processing unit capacity that is sufficient to accommodate the first estimated central processing unit utilization for the first task; and
sending the first task to the first sub-data router based on the determining that the first sub-data router has the lowest memory capacity that is sufficient and the determining that the first sub-data router has the central processing unit capacity that is sufficient for the processing of the first task, the processing of the first task comprising the first sub-data router identifying at least one data node having the at least the portion of the file stored in the distributed data storage system and the first sub-data router sending instructions to the at least one data node of the distributed data storage system that is identified to perform at least one function associated with the accessing of the at least the portion of the file stored in the distributed data storage system in accordance with the first task.

17. A method comprising:
receiving, by a processor of a first task handler, a first request for processing a first task, the first request including a first estimated central processing unit utilization for executing the first task on at least one sub-data router of a plurality of sub-data routers and a first estimated memory utilization for executing the first task on the at least one sub-data router, the first task, when executed on the at least one sub-data router of the plurality of sub-data routers, comprising the at least one sub-data router accessing at least a portion of a file stored in a distributed data storage system;
periodically receiving, by the processor, a respective central processing unit capacity and a respective memory capacity of each of the plurality of sub-data routers, the plurality of sub-data routers including at least the first sub-data router;
determining, by the processor, that a first sub-data router has a lowest central processing unit capacity from among the plurality of sub-data routers that is sufficient to accommodate the first estimated central processing unit utilization for the first task;
determining, by the processor, that the first sub-data router has a memory capacity that is sufficient to accommodate the first estimated memory utilization for the first task, the first estimated memory utilization comprising an estimated quantity of memory that at least one central processing unit of the first-sub data router is to use for at least instructions and data for the processing of the first task, the processing of the first task comprising the first sub-data router identifying at least one data node having the at least the portion of the file stored in the distributed data storage system and the first sub-data router sending instructions to the at least one data node of the distributed data storage system that is identified to perform at least one function associated with the accessing of the at least the portion of the file stored in the distributed data storage system in accordance with the first task; and
sending, by the processor, the first task to the first sub-data router based on the determining that the first sub-data router has the lowest central processing unit capacity that is sufficient and the determining that the first sub-data router has the memory capacity that is sufficient for the processing of the first task, the processing of the first task comprising the first sub-data router identifying at least one data node having the at least the portion of the file stored in the distributed data storage system and the first sub-data router sending instructions to the at least one data node of the distributed data storage system that is identified to perform at least one function associated with the accessing of the at least the portion of the file stored in the distributed data storage system in accordance with the first task.

18. The method of claim 17, further comprising:
receiving, by the processor, a second request to process a second task, the second request including a second estimated central processing unit utilization for the second task and a second estimated memory utilization for the second task.

19. The method of claim 18, further comprising:

determining, by the processor in accordance with the sending of the first task to the first sub-data router, that a second sub-data router of the plurality of sub-data routers has a current lowest central processing unit capacity from among the plurality of sub-data routers that is sufficient to accommodate the second estimated central processing unit utilization for the second task;

determining, by the processor, that the second sub-data router has a memory capacity that is sufficient to accommodate the second estimated memory utilization for the second task; and sending, by the processor, the second task to the second sub-data router based on the determining that the second sub-data router has the current lowest central processing unit capacity that is sufficient and the determining that the second sub-data router has the memory capacity that is sufficient.

20. The method of claim 18, further comprising:

determining, by the processor, that the second estimated central processing unit utilization for the second task is below a threshold central processing unit utilization;

determining, by the processor, that the second estimated memory utilization for the second task is below a threshold memory utilization; and sending, by the processor, the second task to a sub-data router with a lowest latency from among the plurality of sub-data routers.

\* \* \* \* \*